US005778417A

United States Patent [19]

Kentish et al.

[11] Patent Number: 5,778,417

[45] Date of Patent: Jul. 7, 1998

[54] DIGITAL SIGNAL PROCESSING FOR AUDIO MIXING CONSOLE WITH A PLURALITY OF USER OPERABLE DATA INPUT DEVICES

[75] Inventors: William Edmund Cranstoun Kentish, Chipping Norton; Tetsuya Konishi, Wootton; Simon Irving Harrison; John William East, both of Witney, all of United Kingdom

[73] Assignees: Sony Corporation, Tokyo, Japan; Sony United Kingdom Limited, Webridge, England

[21] Appl. No.: 622,391

[22] Filed: Mar. 27, 1996

[30] Foreign Application Priority Data

Mar. 28, 1995 [GB] United Kingdom .................. 9506350

[51] Int. Cl.[6] .................................................. H04B 7/00

[52] U.S. Cl. .................. 711/100; 364/221.4; 364/221.9; 381/107; 381/119; 381/109

[58] Field of Search ................................ 364/514 R, 260, 364/243, 238.3, 239, 238.4, 140, 188, 221.4, 221.9; 395/200.17, 183.06, 183.08; 369/48, 59; 370/241, 249, 360; 381/107, 109, 119; 711/100, 154

[56] References Cited

U.S. PATENT DOCUMENTS

| | | | |
|---|---|---|---|
| 4,187,544 | 2/1980 | Larner | 364/514 |
| 4,479,240 | 10/1984 | McKinley, Jr. . | |
| 4,497,023 | 1/1985 | Moore | 364/200 |
| 4,635,288 | 1/1987 | Stadius . | |
| 5,060,272 | 10/1991 | Suzuki . | |
| 5,239,458 | 8/1993 | Suzuki . | |
| 5,303,218 | 4/1994 | Miyake | 369/48 |
| 5,319,359 | 6/1994 | Zampini et al. . | |
| 5,396,618 | 3/1995 | Fukui et al. | 395/575 |
| 5,434,626 | 7/1995 | Hayashi et al. | 348/569 |
| 5,467,288 | 11/1995 | Fasciane et al. | 364/514 R |

FOREIGN PATENT DOCUMENTS

| | | |
|---|---|---|
| 0251646 A2 | 6/1987 | European Pat. Off. . |
| 0536 959 A2 | 10/1992 | European Pat. Off. . |
| 0571638 A1 | 12/1992 | European Pat. Off. . |
| 2073994 | 2/1980 | United Kingdom . |
| 2140248 | 11/1984 | United Kingdom . |
| 2255696 | 11/1992 | United Kingdom . |
| 2255696A | 11/1992 | United Kingdom . |
| 2266210 | 10/1993 | United Kingdom . |
| 2276800 | 10/1994 | United Kingdom . |
| WO 87/06404 | 10/1987 | WIPO . |
| WO 91/13497 | 9/1991 | WIPO . |
| WO 91/18456 | 11/1991 | WIPO . |
| WO 92/18943 | 10/1992 | WIPO . |
| WO 93/03549 | 2/1993 | WIPO . |
| WO 93/19525 | 9/1993 | WIPO . |

*Primary Examiner*—James P. Trammell
*Assistant Examiner*—Bryan Bui
*Attorney, Agent, or Firm*—Frommer Lawrence & Haug LLP; William S. Frommer

[57] ABSTRACT

Digital signal processing apparatus, such as a digital audio mixing console, comprising a control panel having a plurality of user-operable data input devices for specifying signal processing parameters to be applied to an input digital signal. The apparatus further includes a detecting device for detecting the status of the data input devices and for writing control data indicative of the status of the data input devices into a data memory at respective memory addresses associated with each data input device, and a signal processing device for reading the control data from the data memory and for processing the input digital signal in response to parameters represented by the control data.

20 Claims, 6 Drawing Sheets

DIGITAL SIGNAL PROCESSING FOR AUDIO MIXING CONSOLE WITH A PLURALITY OF USER OPERABLE DATA INPUT DEVICES

BACKGROUND OF THE INVENTION

1. Field of the Invention

This invention relates to digital signal processing.

2. Description of the Prior Art

Complex digital signal processing apparatus (such as a digital audio mixing console) is often controlled by a control panel having a large number of data input devices such as linear or rotary potentiometers. Handling data input from the data input devices can give rise to a large processing overhead.

SUMMARY OF THE INVENTION

This invention provides digital signal processing apparatus comprising:

a control panel comprising a plurality of user-operable data input devices for specifying signal processing parameters to be applied to an input digital signal;

detecting means for detecting the status of the data input devices and for writing control data indicative of the status of the data input devices into a data memory at respective memory addresses associated with each data input device; and signal processing means for receiving the control data from the data memory and for processing the input digital signal in accordance with parameters derived from the control data.

The invention addresses the problem described above by providing separate detecting means which detects the status (e.g. position in the case of a potentiometer) of the data input devices and writes data indicative of those positions into a memory which is shared with a signal processing means. This means that the signal processing means needs to consult data from the shared memory to ascertain the latest status of a data input device only when that information is required.

Preferably the data input devices are digitized variable position control devices, the status of the devices being the respective positions of the devices. In particular, it is preferred that the data input devices are linear and/or rotary potentiometers.

For convenient transfer of data to the signal processing means, without necessarily having to waste processing resources by continuously scanning the memory, it is preferred that the apparatus comprises a data transfer buffer; and that the detecting means is operable to detect changes in the status of the devices and, in response to the detection of a change in status of a device, to write data identifying that device into the data transfer buffer.

Preferably the data transfer buffer is a first-in-first-out buffer, and it is also preferred that the data transfer buffer is operable to issue an interrupt signal to the signal processing means when data is written into the data transfer buffer by the detecting means, to initiate reading of the data transfer buffer. Preferably the apparatus comprises a panel processor for accessing the data memory, and the data transfer buffer, and a control processor for communicating between the panel processor and the signal processing means. The control processor could communicate with a number of panel processors associated with respective panels, or even a general purpose computer acting as a panel emulator.

In order to communicate a change of status (position) of a binary switch or button, it is preferred that the apparatus comprises a switch data transfer buffer; the control panel comprises one or more binary switches; and the detecting means comprises means for detecting a change in the status of the binary switches and, in response to the detection of a change, for writing data identifying that switch into a switch data transfer buffer.

Since the switch is a binary (on/off) device, it is necessary only to specify which switch has changed state; the signal processing means can then assume that the switch has changed from its previous state to the complementary state.

Preferably the detecting means is operable to scan the data input devices in a predetermined repetitive order to detect the status of the data input devices.

In order to tie together the physical panel controls, the addresses in the data memory and logical control names for use by the signal processing means, it is preferred that the apparatus comprises means for storing first panel data, for use by the detecting means, containing data indicative of the respective memory address and respective position in the predetermined scanning order for each data input device; and means for storing second panel data, for use by the panel processor and the control processor, containing data indicative of the respective memory address and a respective logical name of each data input device.

It is often the case that the user of a large manufactured signal processing apparatus such as a digital audio mixing console will wish to implement a "customised" function of his own. While this could be achieved by routing the processed signal out of the console, through an external processing device and back into the console, this is a cumbersome solution which can often lead to undesirable processing delays in, for example, analogue-to-digital and digital-to-analogue converters.

Accordingly, this invention also provides digital signal processing apparatus comprising:

a control panel comprising a plurality of user-operable data input devices, a first predetermined subset of the data input devices specifying processing parameters for predetermined signal processing operations to be applied to an input digital signal;

user-operable means for selecting signal processing operations to be applied to the input digital signal in response to a second predetermined subset of the data input devices;

signal processing means operable to process the input digital signal in response to the first and second subsets of the data input devices.

This aspect of the invention recognises that the user may wish to implement a customised function on the apparatus itself, but that unlimited user access to the operation of the apparatus could be dangerous and lead to a breakdown of the apparatus. Accordingly, only a limited subset of the apparatus' controls are made available for user customisation, with the remainder of the controls not being assignable by the user. Similar principles could be applied to data output devices such as LEDs or meters.

Preferably the data input devices comprise one or more of the following: linear potentiometers; rotary potentiometers; and binary switches.

In order that the user cannot generate a set of processing operations which can then not be disabled, it is preferred that the first subset of the data input devices comprises means for enabling and disabling operation of the second subset of the data input devices.

Preferably the signal processing means comprises a plurality of parallel processing devices. In this case, although the processing operations for the second subset of controls could be interleaved with those of the first subset, in a preferred embodiment respective groups, each comprising one or more of the processing devices, are reserved for carrying out processing operations relating to each subset of the data input devices.

The invention is particularly useful where the input digital signal is a digital audio signal, which may possibly be a multi-channel audio signal.

In apparatus in which the controls are assignable between different data streams or channels and preselected processing functions to be carried out on those channels, a relatively small number of controls can be used to control a large number of functions on a large number of audio channels. However, while assignable consoles allow a physically much more compact panel to be used, during a complicated processing operation the operator may lose track of the channel or operation currently assigned to the controls.

Accordingly, this invention also provides digital signal processing apparatus comprising:

signal processing means for processing a plurality of streams of input data;

control means comprising assignable user-operable controls for specifying processing parameters to be applied to a currently assigned subset of the streams of input data; and means for displaying a schematic representation of the processing of the plurality of streams of data by the apparatus, the representation indicating the currently assigned subset of the streams of data.

In order to address this problem, a display screen or device of the apparatus is used to display a "map" of the entire apparatus. This can indicate quickly to the user which channels are currently assigned to the various controls. In addition, the user could select a set of channels to be assigned to the controls by moving a mouse or trackerball driven cursor across the map.

Similarly, this invention also provides digital signal processing apparatus comprising:

signal processing means for processing a plurality of streams of input data;

means for displaying a list of data indicative of each of the plurality of streams of data being processed by the apparatus;

control means comprising assignable user-operable controls for specifying processing parameters to be applied to a currently assigned subset of the streams of input data; and user-operable means for selecting one or more items in the list to assign the subset of streams of data to the control means.

This aspect of the invention again makes it easier to manipulate the assignment of channels or data streams to the apparatus controls.

Digital signal processing apparatus according to the invention is particularly applicable for use in an audio mixing console.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
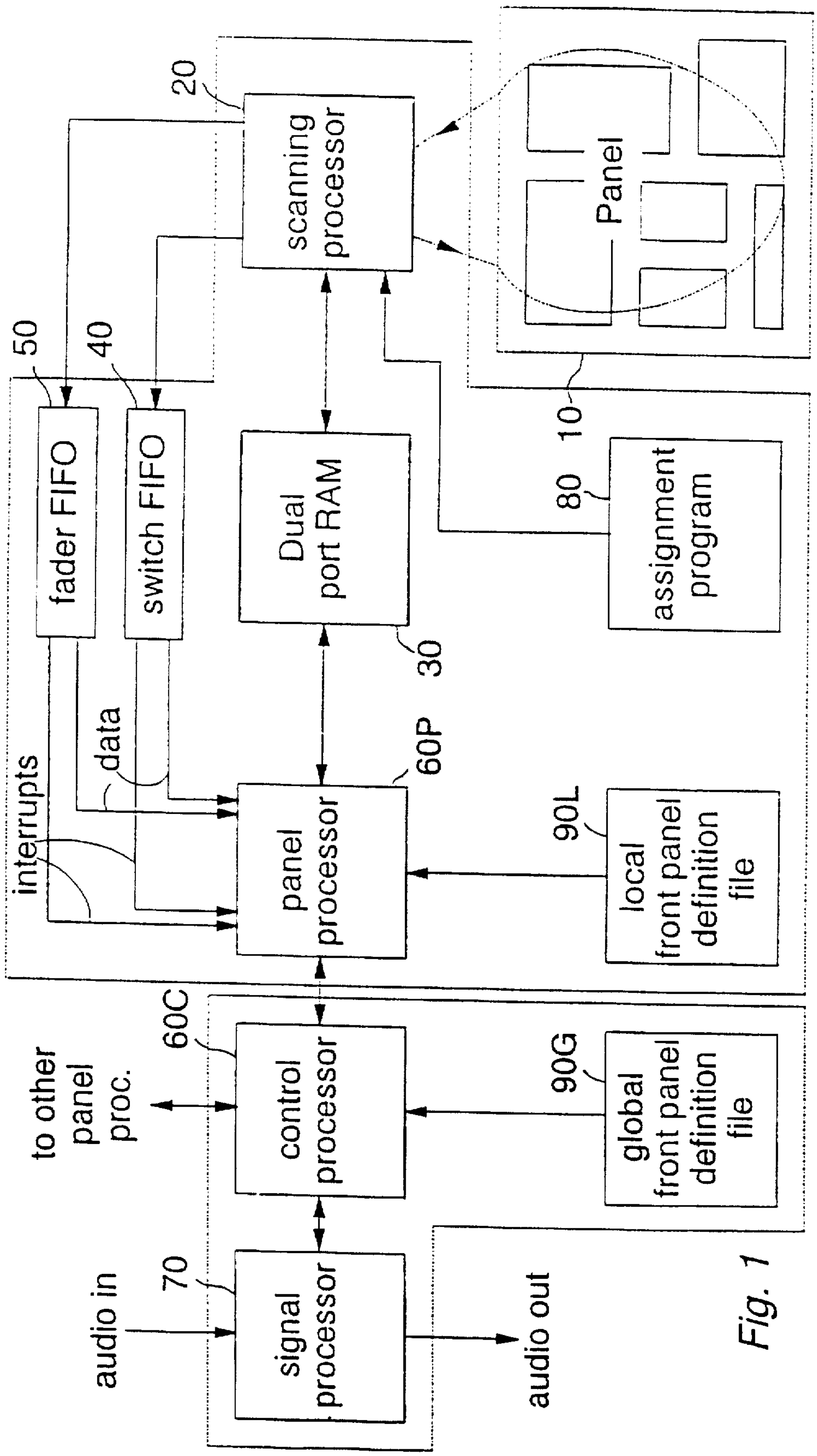
FIG. 1 is a schematic diagram of a digital audio mixing console.

FIG. 1 is a schematic diagram of a digital audio mixing console.

In FIG. 1, the user operates controls on a control panel or desk 10. These controls might be switches, faders, potentiometers and the like. The panel also provides displays of, for example, signal levels, signal routing, equaliser operation and the like.

Information is read from the panel controls by a scanning processor 20. This scans each of the controls on the panel in a repeating predetermined order.

The scanning processor passes information indicative of the control positions to a panel processor 60P via a dual port random access memory (RAM), a switch first-in-first-out (FIFO) register 40 and a fader FIFO 50. The panel processor 60P communicates with a control processor 60C, which in turn controls the operation of a signal processor 70.

The control processor 60C can communicate with a network of panel processors 60P. This allows the signal processor 70 to be controlled from a number of panels 10, for example a bank of panels to allow simultaneous control by two or more audio engineers. Alternatively, a "pseudo-panel" or panel emulating general purpose computer could communicate with the control processor 60C in, for example, automated or debugging operations.

The signal processor 70 receives digital audio data and, in response to control information supplied by the control processor 60C, performs various multiple filtering and mixing operations on the digital audio data.

There is a similar communication process from the control processor 60C to display devices such as meters, video screens or LEDs on the panel 10. To achieve this, the control processor 60C communicates with the appropriate panel processor 60P, which then writes to predetermined addresses in the dual port RAM 30 associated with the display devices. These addresses are then read by the scanning processor 20, which writes the stored values to all of the display devices on the panel 10, again in a predetermined repetitive scanning order.

The scanning processor 20 uses assignment data (actually embodied in an assignment program 80) to determine the addresses to be accessed in the dual port RAM 30 for each panel control and display device. The panel processor 60P refers to a local front panel definition file 90L for communication with the dual port RAM 30, and the control processor 60C refers to a global front panel definition file 90G for communication with the panel processor 60P. The global front panel definition file 90G is effectively a superset of all of the respective local front panel definition files 90L.

The assignment program 80 and the front panel definition file 90L could be, for example, stored in EPROMs and referred to by the scanning processor 20 and the control processor 60 during operation, or could be software files compiled with the source code for operating a programmable control processor and scanning processor. Such software files could be loaded into random access memories associated with the respective processors when the apparatus is initially booted up. Alternatively, as in this embodiment, the assignment program could be embodied as control code to operate a programmable logic device (PLA).

The operations required to detect the position of one of the panel controls will now be described.

The scanning processor 20 scans all of the panel controls such as switches, faders and potentiometers in a predetermined sequence. In fact, the scanning processor may scan several different "chains" of controls in parallel. For example, there could be one scanning chain for panel switches, one for panel potentiometers, and so on.

Switch Operation Detection

When the scanning processor 20 detects a change in the status of a two-way switch or button on the panel, it writes an address value (to be discussed below) defining that switch into the switch FIFO 40. When the new value is written into the switch FIFO 40, the FIFO generates an interrupt signal which is supplied to the panel processor 60P, prompting the panel processor 60P to read the latest contents of the FIFO 40.

In the case of two-way switches, there is no need to supply further data indicative of the new state of the switch on the panel 10. This is because it is assumed that when the switches address is written into the FIFO 40, the status of the switch has toggled from its previous date to the complementary state. Alternatively, however, one or more extra data bits could be stored in the FIFO 40 to indicate the new switch status. This involves a small additional processing overhead, but avoids the actual switch status getting out of step with the switch status used to control the signal processor 70.

Fader Operation Detection

When the scanning processor 20 detects a change in the position of a fader or potentiometer, it writes an address specifying that fader or potentiometer into the fader FIFO 50. Once again, this causes an interrupt signal to be supplied to the panel processor 60P prompting the panel processor to read the latest contents of the FIFO 50. In the case of movement of a fader or potentiometer, which can have many different positions, it is not sufficient simply to indicate that the control has been moved; the new value or position of the control must also be indicated. This is done by the scanning processor 20 writing a value to a predetermined address in the dual port RAM 30 associated with the control which has been moved, indicating the new position of the control. Accordingly, when the interrupt from the fader FIFO 50 is processed by the panel processor 60P, it reads first the information in the fader FIFO 50 and then, using that information, reads the appropriate location in the dual port RAM 30 to detect the new value of the fader or potentiometer position.

For communication from the panel processor 60P to the panel display devices, the scanning processor 20 continuously scans a set of addresses in the dual port RAM 30 which hold information specifying the state of the display devices. When the panel processor 60P requires to change one of the display devices, it simply overwrites the appropriate address in the dual port RAM 30.

Accordingly, the front panel definition file 90L serves to map the switch, fader and display functions required by the panel processor 60P onto addresses in the dual port RAM 30. Similarly, the assignment program 80 serves to map addresses in the dual port RAM 30 onto particular physical control or display devices on the panel 10.

The information written by the scanning processor 20 into the fader FIFO 50 when a fader or potentiometer position change is detected is simply the dual port RAM address corresponding to that fader. The information written by the scanning processor 20 into the switch FIFO 40 is a value in a predetermined sequence specifying the switches on the panel 10.

The function of the front panel definition file 90L and the assignment program 80 is summarised in the following table:

| Front Panel Definition File 90L (G) | Assignment Program 80 |
|---|---|
| for communication between control processor, panel processor and dual port RAM | for communication between scanning processor and dual port RAM |
| DPR address(es) mapped to: | DPR address(es) mapped to: |
| logical panel number (if more than one); | logical address on panel; |
| device type; | numerical identifier(s) of device operation; |
| functional identifier (i.e. physical type of device, not signal processing function). | identifier of position in panel scanning sequence; |
| | functional identifier (i.e. physical type of device, not signal processing function). |

In both the assignment program 80 and the front panel definition file 90L, the control or display device operation is specified by a functional identifier. This specifies the type and quantity of information to be extracted from or supplied to the device on the panel 10 by the scanning processor 20, and similarly, the type of information to be extracted from or supplied to the dual port RAM 30 by the panel processor 60P.

In other words, the functional identifier refers to the physical type of device used, rather than to any signal processing function which may be logically assigned to that device.

For example, a single LED requires only a one-bit on/off indication to be written to the dual port RAM 30 by the panel processor 60P. In contrast, a fader control may require, say, an ten-bit quantised position representing any one of 1024 levels to be communicated from the scanning processor to the panel processor via the dual port RAM 30.

Communication between the control processor 60C and the panel processor 60P is via a conventional data transfer network. Panel controls and display devices are referred to in such communication using information from the front panel definition file 90L for the appropriate panel (which forms part of the global front panel definition file 90G).

Figure 2:
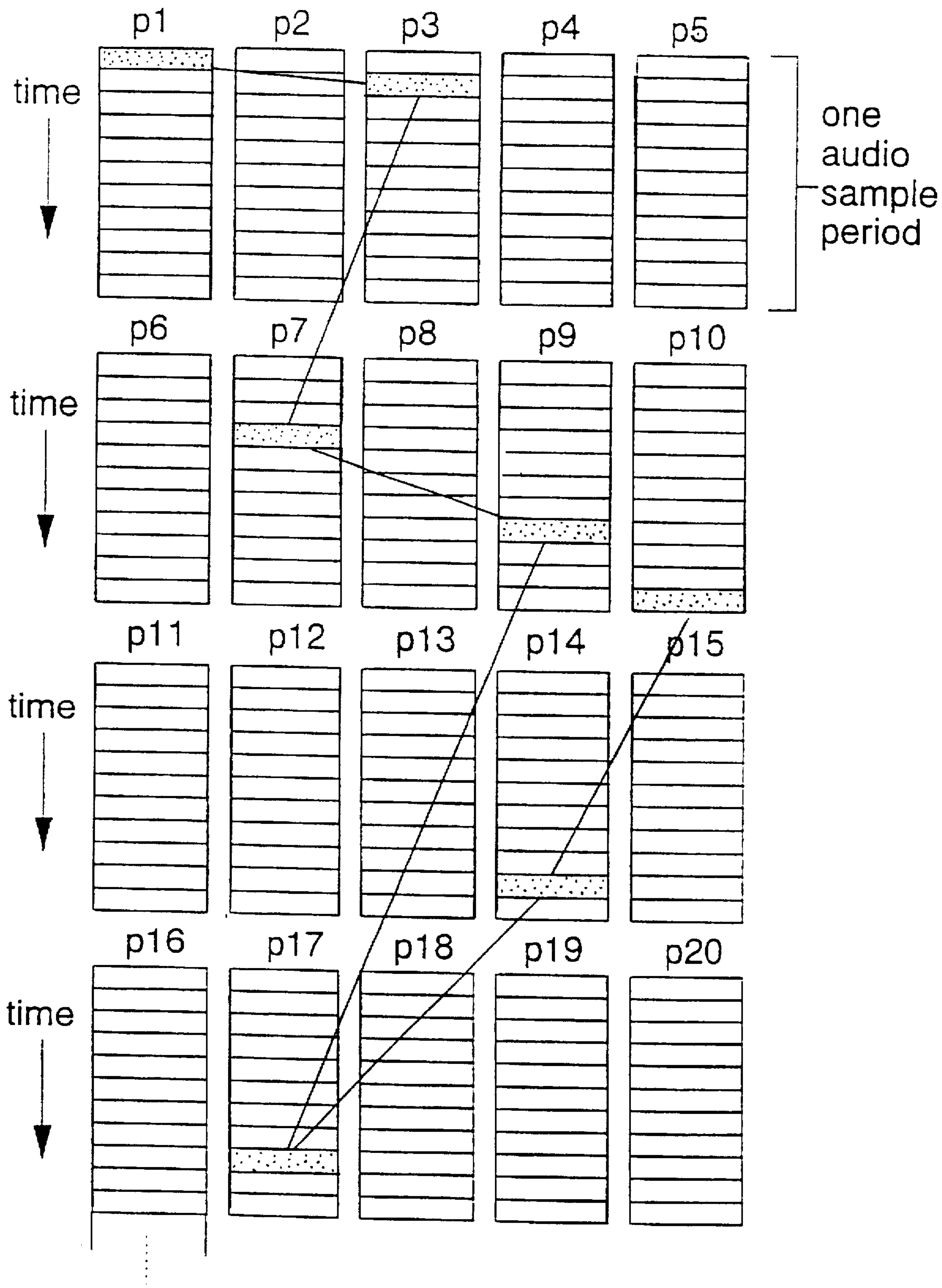
FIG. 2 is a schematic diagram of a parallel signal processor.

Referring now to FIG. 2, the signal processor 70 is a parallel device comprising a large number of parallel processing units. In FIG. 2, only 20 processing units (P1 to P20) are indicated for clarity of the diagram, although many more could be used in practice.

The processing units are linked in a bus network to communicate with one another, so that the processing requirements of a particular task can be split between the different units. Accordingly, during an audio sample period (about 23 microseconds for a 44.1 kHz sample rate), each processing unit carries out a predetermined series of operations (shown as divisions on a vertical axis in FIG. 2) which may relate to many different processing task and audio samples being handled by the signal processor 70 during that sample period. As an example, FIG. 2 illustrates schematically a processing task being handled first by the processing unit P1, and then later during that sample period by P3, P7, P9, P17, P14 and finally P10. The many other processing tasks required during each sample period are similarly interleaved between all of the processing units P1 to P20.

In the present embodiment, no conditional instructions are allowed, so each processing unit follows the same series of instructions during every audio sample period. Naturally, however, it will be appreciated that during successive audio sample periods the same instructions are repeated on successive audio samples.

Figure 3:
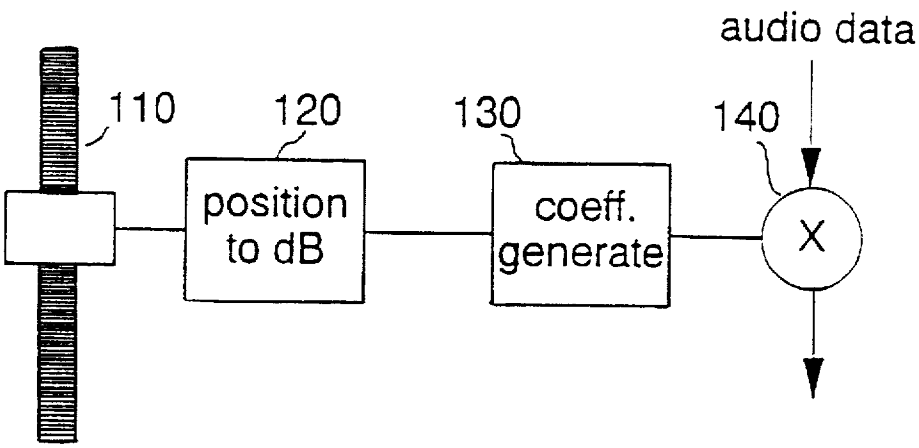
FIG. 3 is a schematic diagram of a part of the digital audio mixing console of FIG. 1.

Referring now to FIG. 3, an example of a small part of the channel processing for one audio channel of a digital audio mixing console comprises a fader (potentiometer) 110, a unit 120 converting the position of the fader into a control quantity (such as decibels of gain) for processing the audio data of that channel, a coefficient generator 130 and a multiplier 140.

In operation, a user can specify the gain to be applied to an input audio signal by moving the fader 110. The physical position of the fader is digitized and passed to the position converter 120. The position converter 120 maps the digitized position of the fader 110 onto a corresponding gain value in decibels, to be passed to the coefficient generator 130 which converts that required signal gain into a multiplication coefficient. The input audio data is then multiplied by that multiplication factor in the multiplier 140.

Comparing FIGS. 1 and 3, the fader 110 forms part of the panel 10, with the scanning processor 20 sampling the digitised position of the fader. The position converter 120 is embodied by the control processor 60C. The operation of the coefficient generator 130 is carried out partly by the control processor 60C and partly by the signal processor 70. Finally, the only part of FIG. 3 which is actually part of the signal path, the multiplier 140, is provided by the signal processor 70.

As mentioned above, the control processor 60 and the signal processor 70 are in fact programmable digital data processing devices running suitable object code to provide the functions described above.

The basic technique for generating suitable object code is described in the following references:

1. "An automated approach to digital console design", W Kentish & C Bell, 81st Audio Engineering Society (AES) Convention preprint, 1996;
2. "Digital audio processing on a grand scale", P Eastty, 81st AES Convention preprint, 1986; and
3. "Automatic generation of microcode for a digital audio signal processor", C McCulloch, 81st AES Convention preprint, 1986.

To summarise the technique described in the above references, a schematic circuit diagram similar in form to that shown in FIG. 3 (but generally of very much greater size and complexity) is set up on a computer-aided design (CAD) system. A netlist is generated from the CAD representation and is then compiled to produce the object code for running on the control processor 60C and the signal processor 70.

Figure 4:
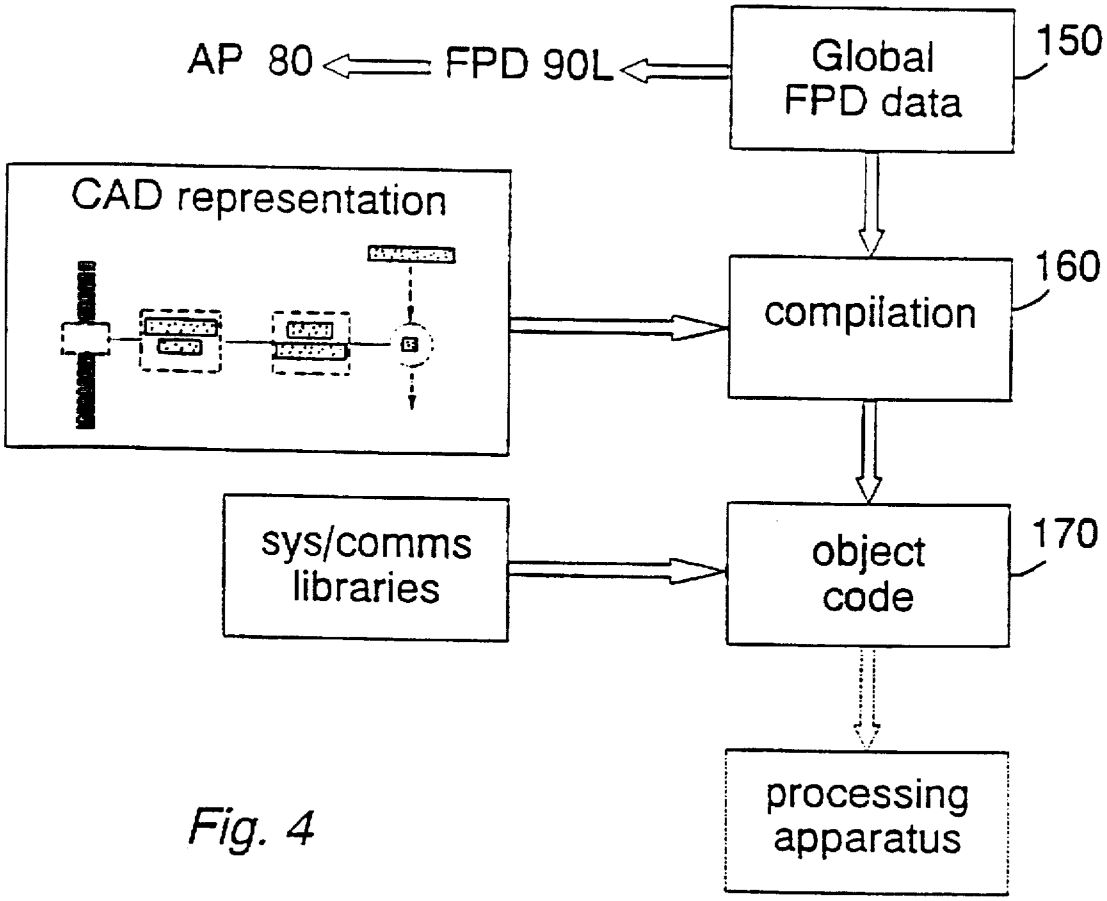
FIG. 4 is a schematic diagram showing the generation of object code for the digital audio mixing console of FIG. 1.

A modified description of this process is illustrated in FIG. 4, in which the CAD representation is passed, along with global front panel definition data 150 from which the local front panel definition file 90L and the assignment program 80 are derived, to a compiler 160 which generates object code 170. This object code is then linked with system and communications library programs using known techniques, and is then loaded into respective program RAM accessed by the scanning processor 20, the control and panel processors 60P,C and the signal processor 70 when the console is booted up or initialised.

It will be appreciated that instead of using the techniques described above, suitable object code could be generated manually using known programming languages and compilation techniques.

The functions of the great majority of the panel controls are selected and set when the object code for running the scanning processor 20, the control processor 60C and the signal processor 70 is generated. This object code is then loaded into RAM (not shown) associated with these devices when the console is initialised.

However, a subset of the panel controls are set aside for the user (e.g. the purchaser, a responsible mixing engineer for the console) or third party signal processing companies to define their function. Such an assignable subset 200 is illustrated schematically in FIG. 5, and comprises (in this example) two fader controls and four on/off buttons 220. Display devices (not shown in FIG. 5) could also be made assignable in this way.

The assignable controls are assigned functions by generating suitable object code for the control processor 60C and the signal processor 70, representing the required functions. There is no need for the user to generate object code for the scanning processor 20 to read the status of the assignable controls 200, since that object code can be included when the remainder of the scanning processor object code is compiled. In other words, if no signal processing functions are assigned by the user to the assignable controls 200, the scanning processor would still read the status of those controls and write the appropriate data to the FIFOs 40, 50 and the dual port RAM 30. Those addresses in the dual port RAM 30 would be given "hook" name entries in the front panel definition file 90, which define the physical characteristics of the respective panel devices. The hook names can then be referred to by the object code generated by the user for the control processor 60C and the signal processor 70.

The user can generate the required object code for the control processor and the signal processor by running either a full scale or a reduced version of the CAD system referred to above. The user would produce a small schematic diagram 230, similar to that shown in FIG. 3, linking the assignable controls 200 to various audio processing operations such as mixing and filtering operations. The CAD schematic diagram would then be compiled as described above with reference to FIG. 4. The appropriate front panel definition files would already exist, having been set up with the "hook" names and addresses referred to above; the CAD schematic simply needs to refer to the hook names.

Figure 5:
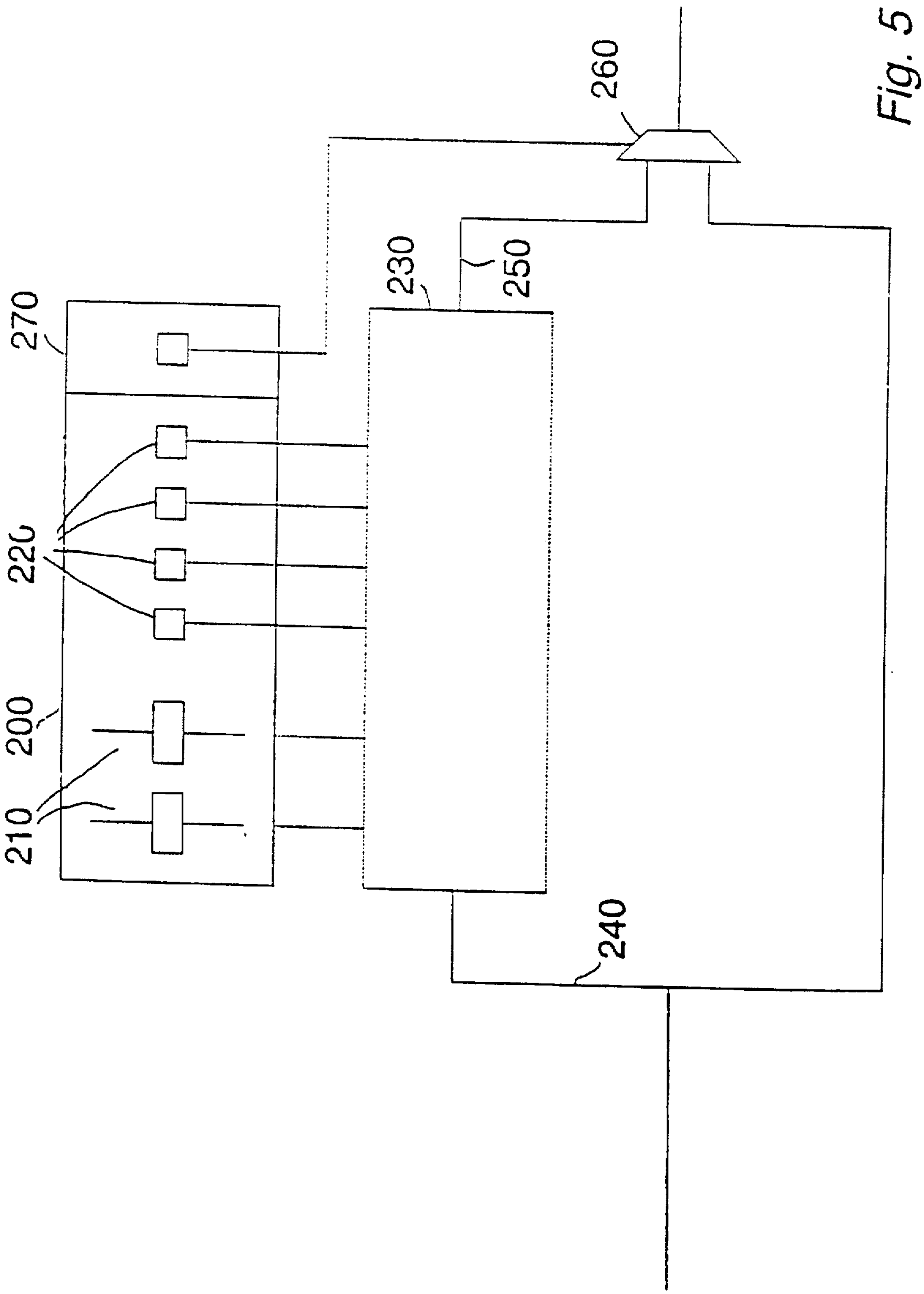
FIG. 5 is a schematic diagram of an assignable portion of a control panel.

In FIG. 5, the CAD schematic 230 for the assignable controls 200 is shown receiving audio input signals 240 and generating audio output signals 250. The output signals 250 are routed to a multiplexer 260, which also receives directly the input signals 240. The multiplexer is controlled by a switch or button 270, the function of which is not alterable or assignable by the user, so that if the user makes an error in producing object code for operating the assignable controls 200, those controls can always be completely bypassed in the signal path.

The object code generated by the user in this way can be run on the control processor 60C (together with the originally supplied object code, using known multitasking techniques) or a separate, similar, control processor dedicated to the assignable controls 200. In either event, the code is linked to pre-existing entries in the front panel definition file 90G referring to the assignable controls 200.

The signal processing object code can be run on a dedicated and reserved one of the processing units P1 . . .

P20. Alternatively, since it is practically impossible for code compilation in a multiple parallel processing system to make 100% use of the processing capacity of the multiple processing units, the object code could be interspersed between processing units, following processing paths similar to that illustrated in FIG. 2.

The description above has referred to freely assignable controls 200 of the panel 10. In other words, the user can select processing functions to be assigned to those controls from a library of different functions.

In a different sense, the whole of the mixing console of the present embodiment is assignable between different audio channels and preselected processing functions to be carried out on those channels, so that a relatively small number of controls can perform a large number of functions on a large number of audio channels. This assignability is predetermined in that it does not affect the operations performed on the input audio channels, but merely changes the processing operations which are currently under the control of the limited number of panel controls.

For example, the console may handle 128 audio channels. A bank of 128 channel faders and a further bank of 128 sets of equalisation controls would be very cumbersome and inconvenient to use. Accordingly, a reduced number of faders and controls is used, such as two banks of 16 assignable faders and two sets of assignable equalization controls. In this way, at any time the user can control the gain of 32 (2×16) channels and the equalisation for one channel from each bank of 16 channels. Once appropriate settings have been made for the currently controlled channels, the faders and/or equalisation controls can be assigned to others of the 128 channels.

In this embodiment the assignment of console controls is made particularly convenient by the techniques used to pass data to and from the panel 10 via the dual port RAM 30. In particular, only the scanning processor needs to know (from the assignment table 80) the physical configuration and layout of the panel. The dual port RAM decouples the panel hardware from the signal processing and control functions using the front panel definition file. The control processor 60C is able to address each data input device (e.g. potentiometer, fader, switch etc) and each data display device via a logical reference set up in the front panel definition file.

While assignable consoles allow a physically much more compact panel to be used, during a complicated mixing operation the operator may lose track of the channel or operation currently assigned to the mixer controls.

Figure 6:
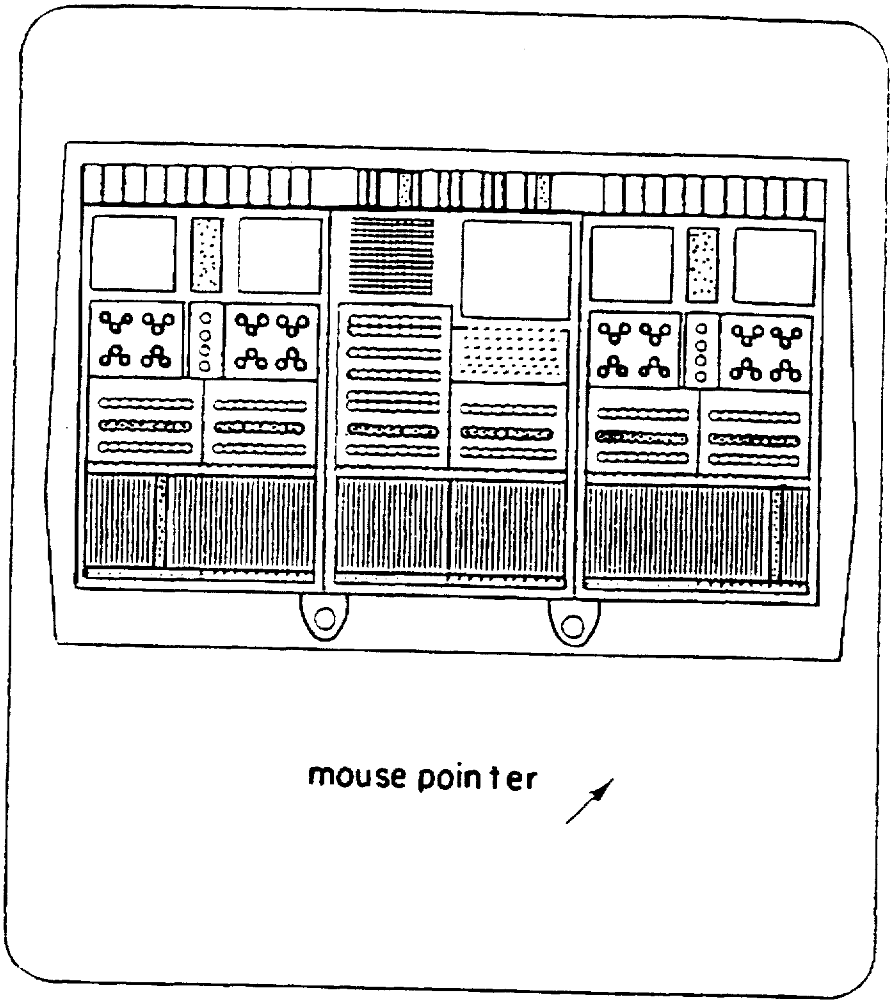
FIG. 6 is a schematic diagram of a display screen on the mixing console of FIG. 1.

In order to address this problem, one of the display devices of the console (in fact, a visual display unit (vdu) screen) can be used to display a "map" of the entire logical console. The map could be, for example a schematic diagram of a console having 128 channels, with the currently selected channels and/or signal processing functions being highlighted. This indicates quickly to the user which channels are currently assigned to the faders and equalisation (and/or other signal processing) controls. In addition, the user could select a set of channels to be assigned to the faders by moving a mouse or trackerball driven cursor across the map. An example of such a map is illustrated schematically in FIG. 6.

Figure 7:
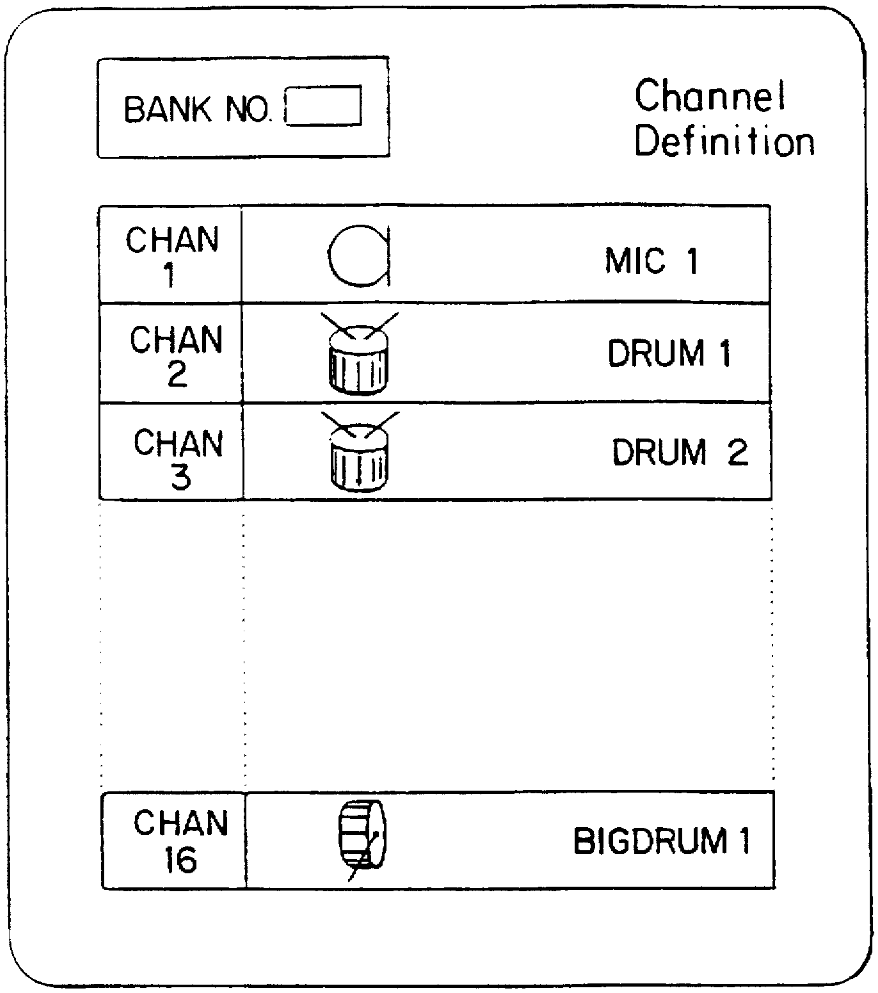
FIG. 7 is a schematic diagram of a second display screen on the mixing console of FIG. 1.

Again, in order to overcome the problem of the operator losing track of the current operation of an assignable console, another one of the display screens of the console can be used to display a list of all of the audio channels being processed by the console. The list may be in numerical order, grouped as associated channel inputs (e.g. from a single instrument or vocalist) or may be in graphical or icon form. The operator can quickly select a channel by moving a trackerball or mouse controlled cursor to the appropriate position on the display screen. An example of this type of display screen is illustrated schematically in FIG. 7.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Digital signal processing apparatus comprising:

a control panel comprising a plurality of user-operable data input devices for specifying signal processing parameters to be applied to an input digital signal;

detecting means for detecting the status of said data input devices and for writing control data indicative of said status of said data input devices into a data memory at respective memory addresses associated with each data input device; and signal processing means for receiving the control data from said data memory and for processing said input digital signal in accordance with parameters derived from said control data.

2. Apparatus according to claim 1, said apparatus comprising a data transfer buffer;

and in which said detecting means is operable to detect changes in said status of said devices and, in response to the detection of a change in status of a device, to write data identifying that device into said data transfer buffer.

3. Apparatus according to claim 2, in which said data transfer buffer is a first-in-first-out buffer.

4. Apparatus according to claim 1, in which said input digital signal is a digital audio signal.

5. Digital signal processing apparatus comprising:

a control panel comprising a plurality of user-operable data input devices for specifying signal processing parameters to be applied to an input digital signal:

detecting means for detecting the status of said data input devices and for writing control data indicative of said status of said data input devices into a data memory at respective memory addresses associated with each data input device: and signal processing means for receiving the control data from said data memory and for processing said input digital signal in accordance with parameters derived from said control data, in which said data input devices are digitized variable position control devices, said status of said devices being the respective positions of said devices.

6. Apparatus according to claim 5, in which said data input devices are linear and/or rotary potentiometers.

7. Digital signal processing apparatus comprising:

a control panel comprising a plurality of user-operable data input devices for specifying signal processing parameters to be applied to an input digital signal;

detecting means for detecting the status of said data input devices and for writing control data indicative of said status of said data input devices into a data memory at respective memory addresses associated with each data input device;

signal processing means for receiving the control data from said data memory and for processing said input digital signal in accordance with parameters derived from said control data;

a data transfer buffer;

and in which said detecting means is operable to detect changes in said status of said devices and, in response to the detection of a change in status of a device, to write data identifying that device into said data transfer buffer; and a panel processor for accessing said data memory, and said data transfer buffer, and a control processor for communicating between said panel processor and said signal processing means.

8. Apparatus according to claim 7, in which said data transfer buffer is operable to issue an interrupt signal to said panel processor when data is written into said data transfer buffer by said detecting means, to initiate reading of said data transfer buffer by said panel processor.

9. Apparatus according to claim 7, in which said detecting means is operable to scan said data input devices in a predetermined repetitive order to detect said status of said data input devices.

10. Apparatus according to claim 9, comprising:

means for storing first panel data, for use by said detecting means, containing data indicative of said respective memory address and respective position in said predetermined scanning order for each data input device; and means for storing second panel data, for use by said panel processor and said control processor, containing data indicative of said respective memory address and a respective logical name of each data input device.

11. Digital signal processing apparatus comprising:

a control panel comprising a plurality of user-operable data input devices for specifying signal processing parameters to be applied to an input digital signal;

detecting means for detecting the status of said data input devices and for writing control data indicative of said status of said data input devices into a data memory at respective memory addresses associated with each data input device; and signal processing means for receiving the control data from said data memory and for processing said input digital signal in accordance with parameters derived from said control data; in which:

said apparatus comprises a switch data transfer buffer;

said control panel comprises one or more binary switches; and said detecting means comprises means for detecting a change in said status of said binary switches and, in response to the detection of a change, for writing data identifying that switch into a switch data transfer buffer.

12. Digital signal processing apparatus comprising:

a control panel comprising a plurality of user-operable data input devices for specifying signal processing parameters to be applied to an input digital signal;

detecting means for detecting the status of said data input devices and for writing control data indicative of said status of said data input devices into a data memory at respective memory addresses associated with each data input device;

signal processing means for receiving the control data from said data memory and for processing said input digital signal in accordance with parameters derived from said control data; in which:

said control panel comprises one or more data output devices;

said control processor is operable to communicate data for output by one or more of said data output devices to a panel processor;

said panel processor is operable to write said data for output into respective memory addresses associated with said data output devices; and a scanning processor operable to read said data for output from said data memory and to initiate output of that data by said respective data output devices.

13. Digital signal processing apparatus comprising:

a control panel comprising a plurality of user-operable data input devices, a first predetermined subset of said data input devices specifying processing parameters for predetermined signal processing operations to be applied to an input digital signal;

user-operable means for selecting signal processing operations to be applied to said input digital signal in response to a second predetermined subset of said data input devices;

signal processing means operable to process said input digital signal in response to said first and second subsets of said data input devices.

14. Apparatus according to claim 13, in which said control panel comprises a plurality of data output devices; and said user-operable means is operable to select data sources for output by a predetermined subset of said data output devices.

15. Apparatus according to claim 13, in which said data input devices comprise one or more of the following:

linear potentiometers;

rotary potentiometers; and binary switches.

16. Apparatus according to claim 13, in which said first subset of said data input devices comprises means for enabling and disabling operation of said second subset of said data input devices.

17. Apparatus according to claim 13, in which said signal processing means comprises a plurality of parallel processing devices.

18. Apparatus according to claim 17, in which respective groups, each comprising one or more of said processing devices, arc reserved for carrying out processing operations relating to each subset of said data input devices.

19. Digital signal processing apparatus comprising:

signal processing means for processing a plurality of streams of input data;

control means comprising freely assignable user-operable controls for selecting processing parameters from a library of parameters to be applied to a currently assigned subset of said streams of input data; and means for displaying a schematic representation of said processing of said plurality of streams of data by said apparatus, said representation indicating the currently assigned subset of said streams of data.

20. Digital signal processing apparatus comprising:

signal processing means for processing a plurality of streams of input data;

means for displaying a list of data indicative of each of said plurality of streams of data being processed by said apparatus;

control means comprising freely assignable user-operable controls for selecting processing parameters from a library of parameters to be applied to a currently assigned subset of said streams of input data; and user-operable means for selecting one or more items in the list to assign said subset of streams of data to said control means.

* * * * *